(12) United States Patent
Fulli et al.

(10) Patent No.: US 7,224,751 B2
(45) Date of Patent: May 29, 2007

(54) DEVICE AND METHOD FOR CHECKING WHETHER A SIGNAL WITH A PREDETERMINED FREQUENCY IS BEING RECEIVED

(75) Inventors: Alessandro Fulli, Mountain View, CA (US); Peter Pessl, Villach (AT); Christian Schranz, Villach (AT); Michael Staber, Villach (AT)

(73) Assignee: Infineon Technologies AG, Munich (DE)

(*) Notice: Subject to any disclaimer, the term of this patent is extended or adjusted under 35 U.S.C. 154(b) by 818 days.

(21) Appl. No.: 10/296,035

(22) PCT Filed: May 23, 2001

(86) PCT No.: PCT/EP01/05938

§ 371 (c)(1),
(2), (4) Date: May 27, 2003

(87) PCT Pub. No.: WO01/91309

PCT Pub. Date: Nov. 29, 2001

(65) Prior Publication Data

US 2003/0179822 A1    Sep. 25, 2003

(30) Foreign Application Priority Data

May 24, 2000    (DE) .................................. 100 25 581

(51) Int. Cl.
*H04L 27/14*    (2006.01)
(52) U.S. Cl. ...................... 375/324; 375/340; 375/377; 327/37; 327/44; 327/47; 327/48; 327/80; 455/226.1; 455/227; 455/336

(58) Field of Classification Search ................. 375/316, 375/317, 324, 240, 354, 377; 327/18, 20, 327/26, 27, 31, 37, 39, 44, 47, 48, 50, 56, 327/77, 80, 88; 455/154.1, 226.1–226.3, 455/227, 230, 334, 336, 339
See application file for complete search history.

(56) References Cited

U.S. PATENT DOCUMENTS

| 3,526,717 A | | 9/1970 | Himes et al. | |
| 4,232,267 A | * | 11/1980 | Hanajima et al. | ............. 327/48 |
| 4,489,281 A | | 12/1984 | Riyono | |
| 4,554,508 A | | 11/1985 | Haque | |
| 5,103,463 A | | 4/1992 | Schoeneberg | |
| 5,657,316 A | * | 8/1997 | Nakagaki et al. | ........... 370/394 |
| 6,114,880 A | * | 9/2000 | Buer et al. | .................... 327/39 |

OTHER PUBLICATIONS

Gunter Immeyer, "Abstimmhilfe fur RTTY/SSTV bei SSB-Empfangern," p. 86-88, (1989).

* cited by examiner

*Primary Examiner*—Dac V. Ha
(74) *Attorney, Agent, or Firm*—Jenkins, Wilson, Taylor & Hunt, P.A.

(57) ABSTRACT

A device and method are disclosed, whereby the normally complicated and difficult frequency determination is achieved by simply arranged and executed measures, namely by means of larger, smaller and/or equal comparisons and a counting of certain events. The invention further relates to arrangements whereby the noise signal level, or the influence thereof on the verification to be carried out is reduced.

15 Claims, 3 Drawing Sheets

DEVICE AND METHOD FOR CHECKING WHETHER A SIGNAL WITH A PREDETERMINED FREQUENCY IS BEING RECEIVED

TECHNICAL FIELD

The present invention relates to a device according to the precharacterizing clause of claims 1, 5 and 7, and to a method according to the precharacterizing clause of claims 15, 16 and 17, i.e. to a device and to a method for checking whether a signal with a predetermined frequency is being received.

BACKGROUND ART

Such a device and such a method are needed, for example, in the so-called "splitterless integrated voice and data line card".

Splitterless integrated voice and data line cards are electrical circuit boards which are used in telecommunication switching centers (called central offices hereinafter). They have the responsibility for receiving voice data obtained from telecommunication subscribers (called clients hereinafter), identifying these data as voice data, converting them into PCM-coded data and forwarding them, and receiving data obtained via the same line as the voice data and coming from an XDSL modem existing at the client (called client modem hereinafter), identifying these data as data coming from a client modem, converting them into ATM-coded data and forwarding them.

Splitterless integrated voice and data line cards can be constructed in different ways. The splitterless integrated voice and data line card considered at present is a lite version which is standardized in ITU G.lite. ITU G.lite allows parts of the splitterless integrated voice and data line card to be placed into an energy saving mode in which they need much less energy than in normal mode. To wake up the splitterless integrated voice and data line card (in order to be able to put the splitterless integrated voice and data line card back into normal mode if necessary), ITU G.lite defines a so-called wake-up sequence. According to this, the splitterless integrated voice and data line card must be brought from the energy saving mode into the normal mode when it receives a signal with a certain maximum power and one of three predetermined frequencies from the client modem.

The fact that parts of the splitterless integrated voice and data line card can be placed into an energy saving mode is found to be of great advantage since an extraordinary large number of splitterless integrated voice and data line cards may be needed in central offices and considerable energy saving is thus possible.

Utilization of the possibility of placing parts of the splitterless integrated voice and data line card into an energy saving mode presupposes that placing it back into the normal mode functions reliably.

The main problem here is, in particular, the check as to whether a signal with one of the frequencies at which the splitterless integrated voice and data line card must be placed back into normal mode is being received.

This is found to be difficult because the line between the client modem and the central office via which the wake-up signal is to be transmitted can be a line of any length and, in consequence, can have very great attenuation (e.g. a line with a length of approx. 4 km can already have approx. −60 dB attenuation), the transmission of the wake-up signal can be disturbed by noise and by crosstalk, because it can happen that the wake-up signal must pass through parts of the splitterless integrated voice and data line card which are in the energy saving mode, as a result of which the wake-up signal does not arrive with its full power at the device which has to check whether a wake-up signal is being received.

There are doubtlessly possibilities the use of which makes it possible to detect reliably whether a wake-up signal is being received even under these circumstances. However, no possibilities are known which can be implemented in a simple, small and inexpensive manner and, nevertheless, operate reliably. However, the characteristics lacking in the conventional devices and methods are a very important criterion particularly because of the very large number of splitterless integrated voice and data line cards which must be provided.

SUMMARY OF THE INVENTION

The present invention has the object, therefore, of finding a device and a method by means of which it can be checked reliably with little expenditure whether a signal with a predetermined frequency is being received.

According to the invention, this object is achieved by the devices according to claims 1, 5 and 7 and by the methods according to claims 15, 16 and 17.

The methods and devices according to the invention are distinguished by the fact that the received signal or a signal based on the received signal is compared with one or more threshold values, selected changes or all changes in the result of the comparison are counted, the number of changes in the result of the comparison determined is compared with one or more predetermined values, and depending on the result of this comparison, the device decides whether a signal with the predetermined frequency is being received or not (device according to claim 1), and the device determines repeatedly whether a signal with the predetermined frequency is being received, a device for comparing the sequence of results of the determination is provided which compares the sequence of results of the determination obtained during the repeated determination with one or more predetermined sequences of results of a determination, and depending on the result of this comparison, the device decides whether a signal with the predetermined frequency is being received or not (device according to claim 5), and a control device is provided which, in the case where a signal with a frequency which is much higher than the predetermined frequency is apparently being received, makes changes in the device by means of which the noise signal level and/or its influence on the check to be performed are reduced (device according to claim 7), and the received signal or a signal based on the received signal is compared with one or more threshold values, selected changes or all changes in the result of the comparison are counted, the number of changes in the result of the comparison determined is compared with one or more predetermined values, and depending on the result of this comparison, a decision is made whether a signal with the predetermined frequency is being received or not (method according to claim 15), and it is repeatedly determined whether a signal with the predetermined frequency is being received, the sequence of results of the determination obtained during the repeated determination is compared with one or more predetermined sequences of results of a determination, and depending on the result of this comparison, a decision is made whether a signal with the predetermined frequency is being received or not (method according to claim 16), and in the case where a signal with a frequency which is much higher than the predetermined frequency is apparently being received, changes are made in the device carrying out the check by means of which the noise signal level and/or its influence on the check to be performed are reduced (method according to claim 17).

The claimed devices and the devices needed for carrying out the claimed methods can be largely constructed in digital technology, as a result of which they can be implemented in a relatively small and simple manner.

In the claimed devices and methods, in addition, measures are taken by means of which the risk of wrong decisions is reduced to a minimum.

In consequence, the claimed devices and methods make it possible, both by themselves and in combination with one another, reliably to check with little expenditure whether a signal with a predetermined frequency is being received.

Advantageous further developments of the invention can be found in the subclaims, the following description and the figures.

BRIEF DESCRIPTION OF THE DRAWINGS

In the text which follows, the invention will be explained in greater detail by means of illustrative embodiments and referring to the figures, in which.

DETAILED DESCRIPTION OF THE INVENTION

The devices described in the text which follows, and the methods described in the text which follows, are optimized for use in the "splitterless integrated voice and data line card" already mentioned initially; in the example considered, the devices are a part of a splitterless integrated voice and data line card. However, there is no restriction to this. The devices and the methods can also be used in any other systems in which it is necessary to detect the reception of a signal with a predetermined frequency.

Figure 1:
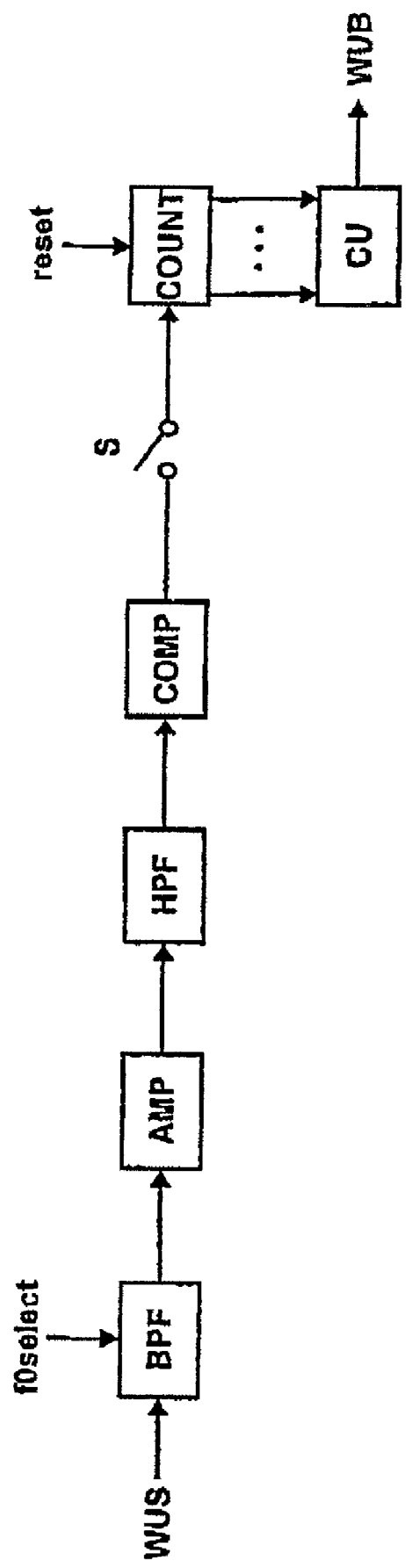
FIG. 1 shows a first device for checking whether a signal with a predetermined frequency is being received.

In FIG. 1, a first illustrative embodiment of a device is shown by means of which it is possible to check whether a signal with a predetermined frequency is currently being received.

The signal with the predetermined frequency is the wake-up signal which is output by the client modem, if required, in order to place at least parts of the splitterless integrated voice and data line card back into normal mode from the energy saving mode.

The wake-up signal to be detected is designated by the reference symbol WUS. In the example considered, the wake-up signal can have three different frequencies. The device shown in FIG. 1 first checks whether a wake-up signal having the first wake-up frequency is being received, then checks whether a wake-up signal having the second wake-up frequency is being received and finally checks whether a wake-up signal having the third wake-up frequency is being received; these checks are repeated continuously.

The wake-up signal WUS first passes into a band-pass filter BPF. The band-pass filter BPF, or more precisely the position of the frequency band passed by it, can be adjusted via a control connection fOselect. In the example considered, three frequency bands can be set which are different from one another. The different frequency bands are selected in such a manner that either a wake-up signal having the first wake-up frequency or a wake-up signal having the second wake-up frequency or a wake-up signal having the third wake-up frequency is passed.

The output signal of the band-pass filter BPF is supplied to an amplifier AMP. This amplifier amplifies the signal supplied to it.

The output signal of the amplifier AMP is supplied to a high-pass filter HPF. This is provided for filtering out the noise generated in the amplifier AMP, particularly the so-called flicker noise component. Said flicker noise component is attenuated by the high-pass filter HPF to such an extent that it does not have much influence on the further processing of the signal. In addition, the high-pass filter HPF also eliminates any offset which may be present.

The output signal of the high-pass filter HPF is supplied to a comparator COMP. The comparator COMP operates with hysteresis, i.e.

the comparator COMP outputs an output signal with a first level if the potential of the signal supplied to it exceeds a first (upper) threshold value, and retains this state until the potential of the signal supplied to it drops below a second (lower) threshold value, and the comparator COMP outputs an output signal with a second level if the potential of the signal supplied to it drops below the second (lower) threshold value, and retains this state until the potential of the signal supplied to it exceeds the first (upper) threshold value.

The threshold values are set in such a manner that the noise which is still contained in the signal supplied to the comparator COMP cannot result in any switch-over of the output signal of the comparator COMP, that is to say that the threshold values are above and below the noise signal level. If the device shown in FIG. 1 is supplied with a signal WUS exhibiting one of the wake-up frequencies and the band-pass filter BPF allows this signal to pass, a squarewave signal exhibiting the relevant wake-up frequency is obtained at the output of the comparator COMP; if the device is supplied with a signal having a frequency which is not passed by the band-pass filter BPF or if the device is not supplied with a signal, the output signal of the comparator COMP remains permanently at the 0 level or the 1 level.

The output signal of the comparator COMP is supplied via a switch S to a counter COUNT which it triggers. The counter COUNT thus counts the number of changes in the output signal of the comparator COMP from low level to high level (or the number of changes in the output signal of the comparator COMP from high level to low level). The counting frequency thus corresponds to the frequency of the wake-up signal WUS.

The counter COUNT can "only" count when and as long as the switch S is closed; when the switch S is opened, the counter does not receive a trigger signal which causes to it increment. The switch S is normally opened and is in each case only closed for a quite particular time. Before the switch S is closed, the counter is reset by application of a corresponding signal to a reset terminal reset of the counter. If the switch S is then closed for the determined time, the counter counts at a counting frequency corresponding to the frequency of the wake-up signal WUS during this time. The counting ends when the switch S is opened.

The count reached after the switch S has been opened is supplied to a comparison unit CU which compares it with one or more values which are stored in a look-up table provided in the comparison unit or somewhere else.

The values stored in the look-up table are selected in such a manner that when the count of the counter COUNT corresponds to one of these values, it can be assumed that a wake-up signal having a wake-up frequency is being received.

The circumstance that the count of the counter COUNT is compared not only with one value but with a number of values makes it possible to decide that a signal with one of the wake-up frequencies is being received even
  if the frequency of the received signal does not precisely correspond to one of the wake-up frequencies, and/or
  if disturbances during the transmission or during the evaluation have led to the count of the counter differing to a greater or lesser extent from the count which would have been reached in the undisturbed case.

As an alternative, it can be provided to define in the look-up table one or more value ranges within which the count of the counter COUNT must be located in order to assume that a wake-up signal having a wake-up frequency is being received.

The comparison unit CU and/or the look-up table have a control connection, not shown in FIG. 1, via which it is possible to set the value or values with which the count of the counter COUNT is to be compared. These values differ for the different wake-up frequencies. As an alternative, it can be provided to close the switch S, depending on the wake-up frequency for which the received signal is being examined, in each case for a length of time such that the same count is obtained for all wake-up frequencies.

The comparison unit CU outputs a signal representing the result of the comparison. At the same time, this signal signals whether a wake-up signal having one of the wake-up frequencies is currently being received and can be used as a wake-up bit WUB which causes the parts of the splitterless integrated voice and data line card, placed in the energy saving mode, to be placed back into the normal mode.

Using the device described above it is possible in a surprisingly simple manner to check whether a wake-up signal having one of the wake-up frequencies is being received. In particular, it has been possible to implement the frequency determination, which is normally very expensive and complicated, by measures which can be achieved and performed in a comparatively simple manner, namely by greater-than, less-than and/or equal-to comparisons and by counting certain events; lastly, "only" the zero transitions of the received signals are detected, counted and compared with nominal values or nominal value ranges. In spite of the simple configuration of the device shown in FIG. 1, it operates very reliably. In particular, it is possible, by comparing the count of the counter COUNT with a number of nominal values or a range of nominal values, to ensure that disturbances in the transmission and the evaluation of the wake-up signal do not have a negative influence on the result of the check as to whether a wake-up signal having one of the wake-up frequencies is currently being received. To this is added the fact that the counted events, namely the number of zero transitions of the received signal per unit time, are not disturbed like other characteristics (for example the amplitude variation) of the received signal during the transmission and/or that existing disturbances can be eliminated, for example, by means of the zero transition detector (the comparator COMP) operating with hysteresis and/or in another manner with relatively little expenditure.

Figure 2:
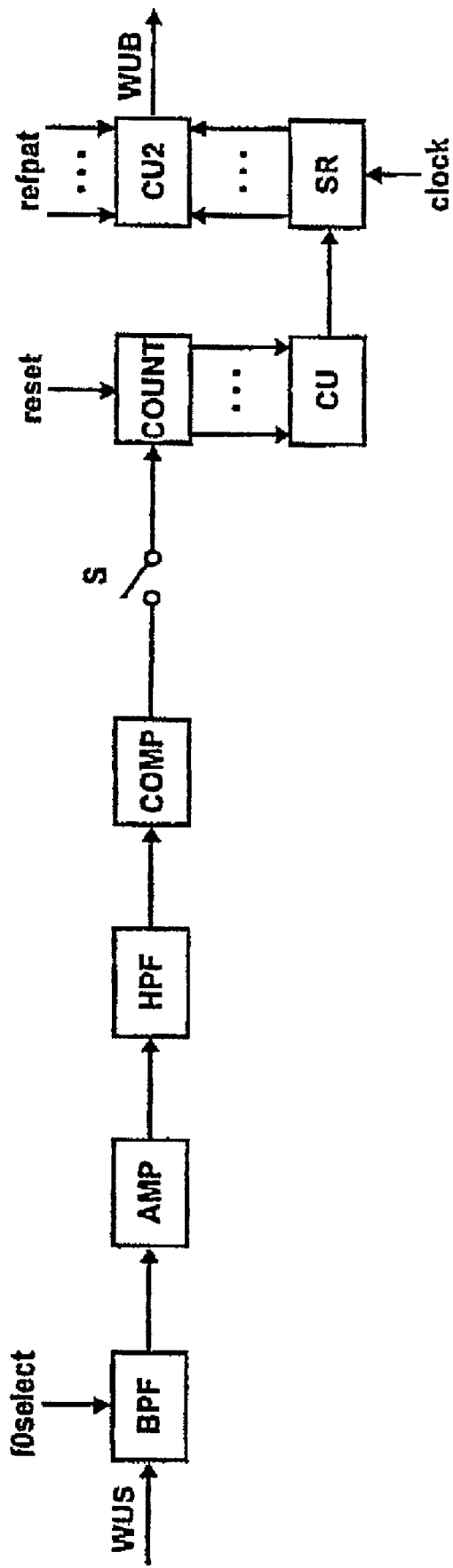
FIG. 2 shows a second device for checking whether a signal with a predetermined frequency is being received.

A device which operates even more reliably is shown in FIG. 2.

Compared with the device in FIG. 1, the device shown in FIG. 2 is distinguished by the fact that the decision whether a signal having one of the wake-up frequencies is being received or not is made on the basis of a sequence of greater or lesser length of events which are obtained during a repeated determination, carried out as in the device according to FIG. 1 or differently, as to whether a signal having one of the wake-up frequencies is being received or not.

In the example considered, the device shown in FIG. 2 contains in its entirety the device shown in FIG. 1 and described with reference thereto, but additionally has a digital evaluation logic (provided after the comparison unit CU); in the example considered, this digital evaluation logic consists of a shift register SR and a second comparison unit (a comparison unit for the sequence of determination results) CU2.

Thus, unlike the device according to FIG. 1, it is not the output signal of the comparison unit CU which is used as output signal of the device. Instead, a decision is made (by the shift register SR and the second comparison unit CU2), in dependence on the variation of the output signal of the comparison unit CU, whether a signal having one of the wake-up frequencies is currently being received.

The output signal of the comparison unit CU is supplied to the shift register SR and transferred into the latter with a clock pulse 'clock' and shifted through. The clock pulse 'clock' preferably has the same frequency as the signal used for controlling the switch S. This stores the variation with time of the output signal of the comparison unit CU in the shift register SR.

The content of the shift register SR is supplied to the second comparison unit CU2 and compared in the latter with one or more reference bit patterns refpat also supplied to the second comparison unit CU2. The second comparison unit CU2 has a control terminal via which it is possible to set the reference bit pattern or bit patterns with which the content of the shift register is to be compared. The signal f0select controlling the band-pass filter BPF can be applied to this control terminal. This is necessary because the data contained in the shift register SR are the result of successively conducted different checks; it is necessary to use different reference bit patterns refpat in dependence on the frequency the reception of which is currently to be checked by the second comparison unit CU2.

The comparison unit CU2 outputs a signal representing the result of the comparison. At the same time, this signal signals whether a wake-up signal having one of the wake-up frequencies is currently being received and, therefore, can be used as the wake-up bit WUB which initiates the resetting into the normal mode of the parts of the splitterless integrated voice and data line card placed in the energy saving mode.

The reference bit patterns are selected in such a manner that a decision that a signal having one of the wake-up frequencies is being received is only made if this has been determined by the comparison unit CU a predetermined number of times in succession and/or a predetermined number of times within a predetermined period of time.

This makes it possible to prevent a decision, that a signal with one of the wake-up frequencies is currently being received from being made on the basis of a disturbance which has the accidental consequence that the output signal of the comparison unit CU wrongly signals the reception of a signal with one of the wake-up frequencies.

Thus, the device for checking whether a signal with a predetermined frequency is being received, shown in FIG. 2 and described with reference thereto, operates even more reliably than the device shown in FIG. 1 and described with reference thereto.

Figure 3:
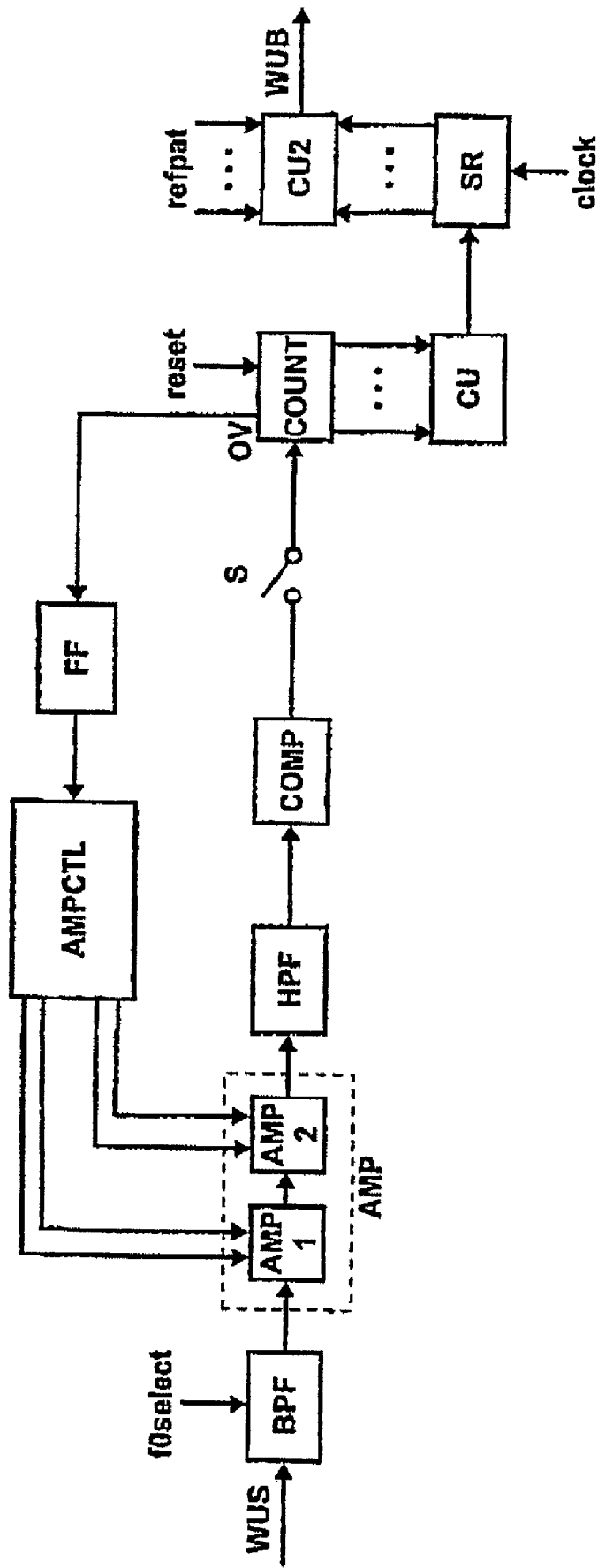
FIG. 3 shows a third device for checking whether a signal with a predetermined frequency is being received.

An even more reliable check as to whether a signal with a predetermined frequency has been received is possible by means of the device shown in FIG. 3.

The device shown in FIG. 3 contains the device shown in FIG. 2 and described with reference to FIGS. 1 and 2, but additionally has a digital adaptation logic which, taking into consideration the given conditions, adjusts the amplifier AMP in such a manner that the check as to whether a wake-up signal is being received cannot be disturbed by noise or other disturbances under any circumstances; in the example considered, this digital adaptation logic consists of a storage device, formed by a flip-flop FF in the present case, and an amplification adjusting device AMPCTL.

The flip-flop FF is connected to a 0 V connection of the counter COUNT indicating an overflow of said counter. It buffers the signal output from the 0 V connection of the counter COUNT and forwards it to the amplification adjusting device AMPCTL.

Depending on the value of the signal supplied to it from the flip-flop FF, the amplification adjusting device AMPCTL changes the gain of the amplifier AMP; it reduces the gain when the signals supplied to it from the flip-flop FF indicates an overflow of the counter and/or it increases the gain when the signal supplied to it from the flip-flop FF does not indicate an overflow of the counter.

This procedure is based on the finding that the counter COUNT can only overflow if the signal output from the amplifier AMP exhibits too much noise or, more precisely, too high a noise signal level. A high noise signal level has the effect that the output signal of the comparator COMP changes much more frequently than would be the case if the comparator were supplied with a signal exhibiting no noise or only little noise (a low noise signal level). When the noise signal level exceeds the threshold values of the comparator, the output signal of the comparator changes so frequently that the counter COUNT triggered by this signal overflows within the time during which the switch S is closed. Naturally, the prerequisite for this is that a counter is used, the maximum count of which is not very much higher than the count which is reached when the comparator is supplied with a noiseless signal exhibiting one of the wake-up frequencies or, respectively, that a counter is used which overflows when the comparator is supplied with a signal with a noise signal level which exceeds the threshold values of the comparator; providing such a counter does not have any negative effects on the operation and the possibility of implementing the device and it can therefore be provided without problems. The overflow of the counter COUNT is an unambiguous indication that the signal supplied to the comparator COMP exhibits so much noise that reliable detection of a signal exhibiting one of the wake-up frequencies is no longer possible. However, the noise of the signal supplied to the comparator COMP can be reduced by reducing the gain of the amplifier AMP. With a lower gain, the noise component contained in the signal supplied to the splitterless integrated voice and data line card is amplified less and, in addition, an amplifier AMP amplifying with a lower gain also generates less noise itself. Thus, adjusting the gain of the amplifier AMP in dependence on the count of the counter COUNT is a very simple and yet extremely effective possibility of adjusting the gain of the amplifier to the ideal value.

There are various possibilities of how the optimum gain can be determined and adjusted.

A first possibility consists in first setting the gain of the amplifier AMP to the maximum value. If the noise signal level is too high, an overflow occurs at the counter COUNT. This causes the amplification adjusting device AMPCTL to reduce the gain. If then (with the reduced gain) another overflow of the counter occurs, the amplification adjusting device AMPCTL again reduces the gain. This process is repeated until a gain adjustment has been reached at which there is no longer an overflow of the counter. This gain setting or a gain setting which has been reduced by another one or more steps as a safety margin is then the ideal gain setting which is preferably used during the check as to whether a signal with a predetermined frequency is being received, and supplies the most reliable results.

As an alternative, it would also be conceivable initially to set the gain of the amplifier AMP to the minimum value and then to increase it until the counter overflows and then to reduce it again by one or more steps.

It would also be conceivable initially to set the gain of the amplifier AMP to a value which is between the minimum value and the maximum value and, starting from there, to reduce the gain step by step (if the counter indicates an overflow) or to increase it step by step (if the counter does not indicate an overflow).

It should be clear that it is also possible to proceed in any other way than has been described above in determining and setting the optimum gain. In particular, it is also possible arbitrarily to define and/or vary, among other things, the size and/or the number of steps by which the gain factor is changed.

In general, it is found to be advantageous if the amplifier AMP has a number of amplifier stages, the gains of which can be changed in steps of different sizes. In the example considered, the amplifier AMP comprises two amplifier stages, designated by the reference symbols AMP1 and AMP2 in FIG. 3, where the gain of the first amplifier stage AMP1 can be changed in large steps and the gain of the second amplifier stage AMP2 can be changed in comparatively small steps.

A gain adjustment made as described or differently makes it possible to adapt the splitterless integrated voice and data line card optimally to the respective situations, particularly to the length of the line between the client modem and the central office (the attenuation) and the existing interference.

It should be clear that it is not mandatory to use the overflow of the counter COUNT as the triggering event for the measures described. As an alternative, it is also possible to use the reaching or exceeding of a particular different count as the triggering event. The reaching or exceeding of the particular count can be detected by monitoring the count output by the counter or selected bits of the count (preferably the most significant bits).

The same result or a similar result can be achieved if, additionally or as an alternative, the band-pass filter BPF, the high-pass filter HPF and/or the comparator (for example the threshold values used by the latter) are influenced in dependence on the count of the counter reached or on other parameters providing information about the noise signal level or other interfering influences.

The devices and methods described make it possible, independently of the details of the practical implementation, with little expenditure but, nevertheless, extremely reliably, to check whether a signal with a predetermined frequency is being received.

If, as in the example considered, it must be checked whether the received signal exhibits one of a number of different frequencies, it may prove to be advantageous if the device described also supplies information about which of the frequencies to be detected are exhibited by the received signal. This information, too, can be obtained from the devices described: the comparison units CU and CU2 can detect which of the frequencies to be detected are exhibited by the received signal from the result of the comparison (from the knowledge of which of the comparisons to be performed produced an agreement)—if necessary, taking into consideration the current or preceding value of the control signal f0select.

What is claimed is:

1. Device for checking whether a signal with a predetermined frequency is being received, wherein:
   (a) the received signal or a signal based on the received signal is compared with one or more threshold values by means of a comparison unit,
   (b) selected changes or all changes in the result of the comparison are counted by means of a counting unit,
   (c) the number of changes in the result of the comparison determined is compared with one or more predetermined values,
   (d) depending on the result of this comparison, a decision unit decides whether a signal with the predetermined frequency is being received or not,
   (e) a control device is provided which, in the case where a signal with a frequency which is much higher than the predetermined frequency is apparently being received, makes changes in the device by means of which the noise signal level and/or its influence on the check to be performed are reduced, and
   (f) the counting device overflows when the comparison device is supplied with a signal with a noise signal level exceeding the threshold values of the comparison device.

2. Device according to claim 1, wherein the comparison of the received signal or of the signal based on the received signal with one or more threshold values is made by a comparator,
   (a) which outputs an output signal exhibiting a first level if the potential of the signal supplied to it exceeds an upper threshold value,
   (b) which outputs the output signal exhibiting the first level until the potential of the signal supplied to it drops below a lower threshold value,
   (c) which outputs an output signal exhibiting a second level if the potential of the signal supplied to it drops below the lower threshold value, and
   (d) which outputs the output signal exhibiting the second level until the potential of the signal supplied to it exceeds the upper threshold value.

3. Device according to claim 2, wherein the changes in the result of the comparison are counted by a counter triggered by the output signal of the comparator.

4. Device according to claim 3, wherein the output signal of the comparator is in each case only forwarded to the counter for a predetermined time.

5. Device for checking according to claim 1, wherein:
   (a) the device determines repeatedly whether a signal with the predetermined frequency is being received,
   (b) a device for comparing the sequence of results of the determination is provided which compares the sequence of results of the determination obtained during the repeated determination with one or more predetermined sequences of results of a determination, and
   (c) depending on the result of this comparison, the device decides whether a signal with the predetermined frequency is being received or not.

6. Device according to claim 5, wherein the results obtained in the repeated determination as to whether a signal with the predetermined frequency is being received are written into a shift register.

7. Device according to claim 1, wherein the change consists in influencing an amplifier for amplifying the signal to be detected, which amplifier is contained in the device.

8. Device according to claim 7, wherein the gain of the amplifier is reduced.

9. Device according to claim 1, wherein the change consists in influencing a filter for filtering the signal to be detected, which filter is contained in the device.

10. Device according to claim 1, wherein the change consists in influencing a comparator for comparing the signal to be detected with one or more threshold values, which comparator is contained in the device.

11. Device according to claim 10, wherein the threshold value or threshold values with which the signal to be detected is compared are changed.

12. Device according to claim 1, wherein the changes are made when a counter, provided for determining the frequency of the received signal, exceeds a predetermined count.

13. Device according to claim 12, wherein the changes are made when the counter overflows.

14. Method for checking whether a signal with a predetermined frequency is being received, wherein:
   (a) the received signal or a signal based on the received signal is compared with one or more threshold values by means of a comparison unit,
   (b) selected changes or all changes in the result of the comparison are counted by means of a counting device,
   (c) the number of changes in the result of the comparison determined is compared with one or more predetermined values, and
   (d) depending on the result of this comparison, a decision is made by means of a decision unit whether a signal with the predetermined frequency is being received or not,
   (e) in the case where a signal with a frequency which is much higher than the predetermined frequency is apparently being received, changes are made in the device carrying out the check by means of which the noise signal level and/or its influence on the check to be performed are reduced, and (f) the counting device overflows when the comparison device is supplied with a signal with a noise signal level exceeding the threshold values of the comparison device.

15. Method for checking according to claim 14 whether a signal with a predetermined frequency is being received, wherein:
(a) it is repeatedly determined whether a signal with the predetermined frequency is being received,
(b) the sequence of results of the determination obtained during the repeated determination is compared with one or more predetermined sequences of results of a determination, and
(c) depending on the result of this comparison, a decision is made whether a signal with the predetermined frequency is being received or not.

* * * * *